March 4, 1958 M. MALAGARIE 2,825,895
LEVEL INDICATOR FOR BRAKE FLUID
Filed March 9, 1956
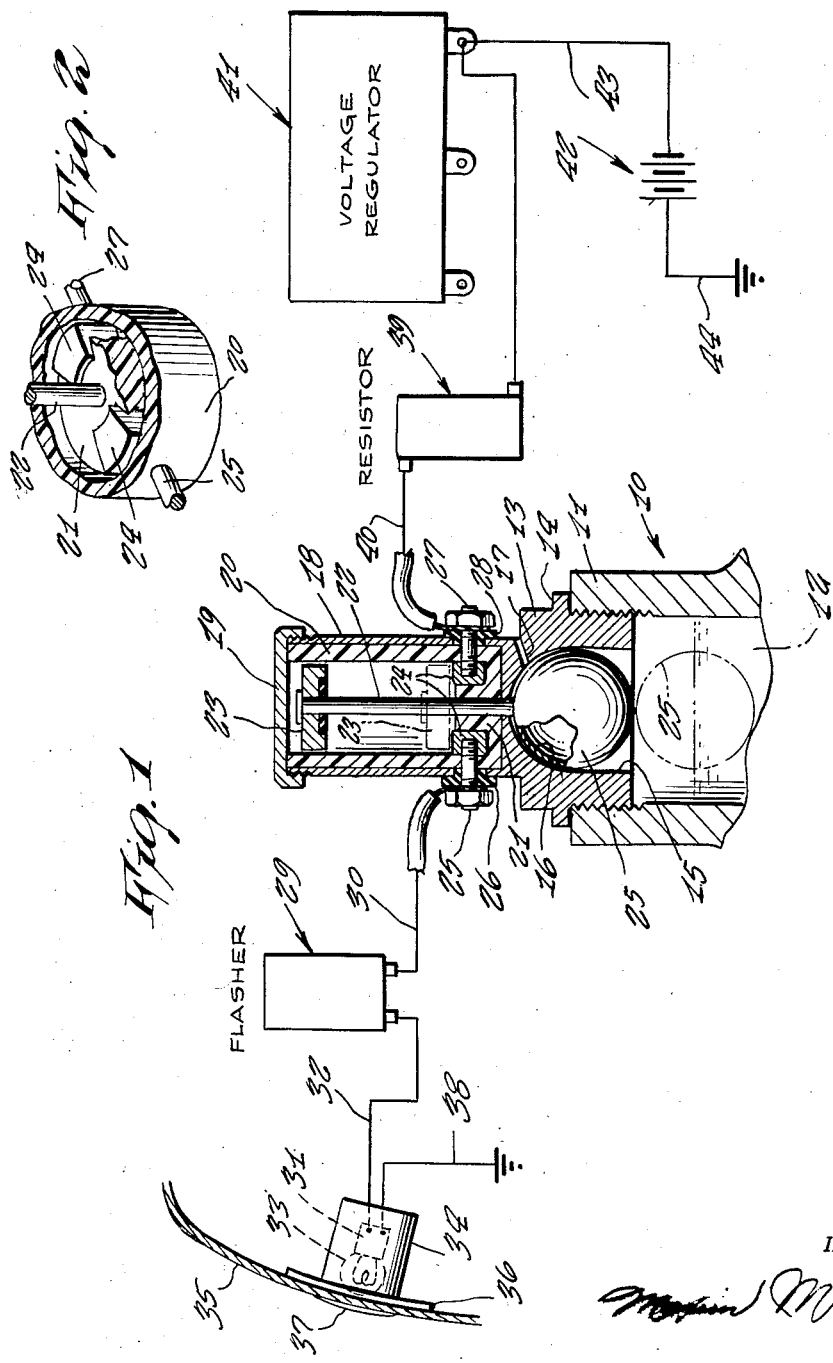
INVENTOR.

2,825,895

LEVEL INDICATOR FOR BRAKE FLUID

Maxim Malagarie, Lafayette, La.

Application March 9, 1956, Serial No. 570,611

1 Claim. (Cl. 340—244)

This invention relates to indicating devices.

It is an object of the present invention to provide a level indicator for brake fluid which will provide immediate warning to the motorist by flasher controlled red light on the dashboard of the automobile that the brake fluid in the master cylinder reservoir is running low due to a master or wheel cylinder fluid leak.

It is another object of the present invention to provide a level indicator for brake fluid of the above type which will indicate visually to the motorist that there is enough brake fluid in the reservoir to make a safe stop and which will warn the motorist that a fluid leak exists and that the car is unsafe to operate until a complete check has been made, thus increasing the safety on the highway.

Other objects of the invention are to provide a level indicator for brake fluid bearing the above objects in mind which is of simple construction, has a minimum number of parts, is inexpensive to manufacture, and efficient in operation.

For other objects and for a better understanding of the invention, reference may be had to the following detailed description taken in connection with the accompanying drawing, in which:

Figure 1 is fragmentary vertical sectional view of a preferred embodiment of the present invention; and Fig. 2 is a fragmentary perspective view of a portion of the device.

Referring now more in detail to the drawing, 10 indicates generally the usual master cylinder of a hydraulic brake system having the usual internally threaded filler neck 11 and within which is disposed the brake fluid 12, substantially as illustrated.

In the practice of my invention, the conventional filler plug of the master cylinder is replaced by the externally threaded filler plug 13 havinng a flange 14 adapted to abut the open upper end of the neck 11. The lower end of the plug 13 is provided with the smooth cylindrical bore 15 which is provided at its upper end with the hemispherical bore 16, the plug 13 having an air vent 17 which connects the hemispherical bore 16 with the atmosphere.

The upper end of the plug 13 is integrally formed with a hollow cylindrical casing 18, the upper end of which is externally threaded and receives thereon the internally threaded cap 19.

A hollow cylindrical liner 20 of bakelite or other suitable material is positioned within the casing 18, the liner 20 being open at the top in abutment with cap 19 and being formed at its lower end with the bottom closure 21. The plug 13 and the bottom closure 21 are provided with vertically aligned openings which communicate with the hemispherical bore 16 and which slidably receive therethrough the elongated rod 22 to the upper end of which is secured a contact ring 23 adapted for vertical movement within the liner 20. The contact ring 23 is formed of electrically conductive material and when in the lower position is adapted to bridge the electrical contacts 24 which are molded in opposite sides of the closure 21, the contacts 24 being formed of electrically conductive material. The contact ring 23 is normally retained in the upper position by means of a hollow spherical float 25 which is received within the hemispherical bore 16 and which floats on the top of the brake fluid liquid 12. However, when the level of fluid 12 within the master cylinder 10 drops to one-half its normal level, the float 25 will move downwardly a corresponding amount to bring the contact ring 23 into the operative position and to bridge the contacts 24 and to signal a warning which will hereinafter become clear.

A contact post 25' is provided, being screw threaded into the contact 24, the contact post 25' being insulated from the casing 18 by means of the insulative bushing 26. A similar contact post 27 and insulative bushing 28 are mounted on the other side in contact with the other contact 24.

The contact post 25' is connected to one terminal of the flasher indicated generally at 29 by means of the conductor 30, the other terminal of the flasher unit 29 being connected to one terminal of the lamp socket 31 by means of the conductor 32. The lamp socket 31 contains the lamp 33 and is suitably mounted within the casing 34 mounted on the inner face of the dashboard 35 by means of the flange 36 and having a glass covering 37 through which the lamp 33 is visible. The other terminal of the lamp socket 31 is grounded by the conductor 38.

The contact post 27 is connected to one terminal of the resistor indicated generally at 39 by means of the conductor 40, the other terminal of the resistor 39 being connected to the voltage regulator indicated generally at 41. The voltage regulator 41 is connected to the storage battery 42 by means of the conductor 43, the other terminal of the storage battery 42 being grounded by conductor 44 to complete the circuit.

Thus, as the level of the brake fluid drops to one-half its normal level within the master cylinder 10, the contacts 24 urged by the contact ring 23 to cause the lamp 33 to flash a warning on the dashboard to the motorist, indicating at this point that there is enough brake fluid reserved in the reservoir to make a safe stop and warning the operator that the fluid leak exists and that the car is unsafe to operate until a complete check has been performed. When the brake fluid system has been checked and the fluid returned to the reservoir, the float 25 will again move the contact ring 23 into the inoperative position.

While various changes may be made in the detail construction, it shall be understood that such changes shall be within the spirit and scope of the present invention as defined by the appended claim.

What I claim as new and desire to protect by Letters Patent of the United States is:

A level indicator for brake fluid housed within a master cylinder having an internally threaded filler neck comprising an externally threaded filler plug having a downwardly opening hemispherical bore extending upwardly from the lower end thereof, an upstanding casing on the upper end of said plug, a rod slidable within said casing and journalled through said plug in communication with said hemispherical bore, a hollow spherical float of substantially the same diameter as said bore secured to the lower end of said rod adapted to fit within said hemispherical bore and to float on the top of the brake fluid within the cylinder, a pair of diametrically oppositely disposed insulated contacts at the bottom of said casing, a contact member adapted to electrically bridge said contacts fixedly carried at the upper end of said rod whereby to bridge said contacts when the level of fluid within the cylinder has dropped a predetermined amount, and electric signal means having said contacts connected in series therewith adapted to warn the motorist that the level of the brake fluid has dropped, a hollow cylindrical lining within said casing of insulated material, and having a bottom closure, said contacts being embedded in said closure, a pair of contact posts connected to said contacts and extending outwardly through said lining and casing, insulative bushings surrounding said contact posts and insulating the same from said casing, said electrical signal means being connected to said contact posts outwardly of said insulative bushings, the upper ends of said lining and casing being open, said casing at the upper end thereof being externally threaded, an internally threaded cap screwed onto said externally threaded upper end whereby to provide access to the interior of said liner when said cap is removed, said signal means comprising a lamp socket, a lamp within said socket, said socket being mounted within the casing mounted on the inner side of the dashboard of the vehicle, and having a glass cover through which said lamp is visible to the motorist, one terminal of said lamp socket being grounded, the other terminal of said lamp socket being connected to one terminal of a flasher unit, the other terminal of said flasher unit being connected to one of said contact posts, a resistor, one terminal of said resistor being connected to the other of said contact posts, the other terminal of said resistor being connected to a voltage regulator, said voltage regulator being connected to one terminal of the car storage battery, the other terminal of said battery being grounded.

References Cited in the file of this patent

UNITED STATES PATENTS

| | | |
|---|---|---|
| 2,450,450 | Schmidinger | Oct. 5, 1948 |
| 2,479,503 | Moore | Aug. 16, 1949 |
| 2,520,237 | Cleary | Aug. 29, 1950 |
| 2,684,414 | Kilpatrick | July 20, 1954 |
| 2,762,997 | Boddy | Sept. 11, 1956 |